United States Patent
Zhang et al.

(10) Patent No.: US 11,043,677 B2
(45) Date of Patent: Jun. 22, 2021

(54) SECONDARY BATTERY AND ELECTRODE MEMBER THEREOF HAVING AN ELECTRICITY GENERATION REGION WITH REDUCED CURVATURE

(71) Applicant: CONTEMPORARY AMPEREX TECHNOLOGY CO., LIMITED, Ningde (CN)

(72) Inventors: Zige Zhang, Ningde (CN); Wei Li, Ningde (CN); Qingrui Xue, Ningde (CN); Jing Li, Ningde (CN); Pengxiang Wang, Ningde (CN); Yang Zhang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/137,077

(22) Filed: Dec. 29, 2020

(65) Prior Publication Data

US 2021/0143441 A1  May 13, 2021

Related U.S. Application Data

(63) Continuation of application No. 16/817,278, filed on Mar. 12, 2020, which is a continuation of application No. PCT/CN2018/117479, filed on Nov. 26, 2018.

(30) Foreign Application Priority Data

Oct. 17, 2018  (CN) .......................... 201811206647.4

(51) Int. Cl.
*H01M 4/66* (2006.01)
*H01M 4/78* (2006.01)
*H01M 4/46* (2006.01)

(52) U.S. Cl.
CPC ........... *H01M 4/667* (2013.01); *H01M 4/463* (2013.01); *H01M 4/78* (2013.01)

(58) Field of Classification Search
CPC ......... H01M 4/667; H01M 4/463; H01M 4/78
See application file for complete search history.

(56) References Cited

U.S. PATENT DOCUMENTS

| | | | |
|---|---|---|---|
| 2007/0048613 A1* | 3/2007 | Yanagida | H01M 4/662 429/245 |
| 2011/0225808 A1* | 9/2011 | Oshima | H01M 4/0411 29/623.1 |

(Continued)

FOREIGN PATENT DOCUMENTS

| | | |
|---|---|---|
| CN | 1819080 A | 8/2006 |
| CN | 101640280 A | 2/2010 |

(Continued)

OTHER PUBLICATIONS

Contemporary Amperex Technology Co., Limited, the Extended European Search Report, EP18932316.5, dated Feb. 15, 2021, 11 pgs.

(Continued)

*Primary Examiner* — Jimmy Vo
(74) *Attorney, Agent, or Firm* — Morgan, Lewis & Bockius LLP

(57) ABSTRACT

The present application relates to a secondary battery and an electrode member thereof. The electrode member includes an insulating substrate, a conducting layer and an active material layer. The conducting layer is provided on a surface of the insulating substrate, and the conducting layer includes a main portion and a protruding portion extending from the main portion, the main portion is coated with the active material layer, the protruding portion is not coated with the active material layer. The active material layer includes a first portion and a second portion, the first portion is posi- (Continued)

tioned at an end of the active material layer away from the protruding portion, the second portion is positioned at a side of the first portion close to the protruding portion, and a thickness of the first portion is less than a thickness of the second portion.

20 Claims, 10 Drawing Sheets

(56) References Cited

U.S. PATENT DOCUMENTS

2015/0171462 A1\* 6/2015 Hong ................ H01M 10/0431
  429/1
2016/0294015 A1\* 10/2016 Tanaka ................ H01M 50/463

FOREIGN PATENT DOCUMENTS

| CN | 107732146 A | 2/2018 |
| CN | 108598491 A | 9/2018 |
| CN | 108598491 A | 9/2018 |
| EP | 3185339 A1 | 6/2017 |
| JP | 2000021453 A | 1/2000 |
| JP | 2010102962 A | 5/2010 |
| KR | 20170111721 A | 10/2017 |
| WO | WO-2012117005 A1 | 9/2012 |

OTHER PUBLICATIONS

Contemporary Amperex Technology Co., Limited, International Search Report and Written Opinion, PCTCN2018117479, dated Jul. 9, 2019, 12 pgs.

\* cited by examiner

SECONDARY BATTERY AND ELECTRODE MEMBER THEREOF HAVING AN ELECTRICITY GENERATION REGION WITH REDUCED CURVATURE

CROSS REFERENCE TO RELATED APPLICATIONS

This application is a continuation application of U.S. patent application Ser. No. 16/817,278, filed on Mar. 12, 2020 which is a continuation application of PCT/CN2018/117479, filed on Nov. 26, 2018, which claims priority to Chinese Patent Application No. 201811206647.4, filed with the National Intellectual Property Administration of the People's Republic of China on Oct. 17, 2018, all of which are incorporated herein by reference in their entirety.

TECHNICAL FIELD

The present disclosure relates to the field of battery, and particularly relates to a secondary battery and an electrode member thereof.

BACKGROUND

An electrode member of a secondary battery generally includes a current collector and an active material layer coated on a surface of the current collector. In order to improve the safety performance of the secondary battery, some electrode members select a current collector having a multi-layer structure, referring to FIG. 1 and FIG. 2, the current collector includes an insulating substrate 11 and a conducting layer 12 provided on a surface of the insulating substrate 11, and an active material layer 13 is coated on a surface of the conducting layer 12. The conducting layer 12 includes a main portion 121 coated with the active material layer 13 and a protruding portion 122 which is not coated with the active material layer 13. The active material layer 13, the main portion 121 and a portion of the insulating substrate 11 corresponding to the main portion 121 form an electric generation region P1, the protruding portion 122 and a portion of the insulating substrate 11 corresponding to the protruding portion 122 form an electric guiding portion P2, the electric guiding portion P2 is used to electrically connect with an electrode terminal of the secondary battery and realize charge and discharge through the electrode terminal.

In the production process of the electrode member, the active material layer 13 needs to be rolled thinly, so as to increase energy density. The insulating substrate 11 is made from a softer material (such as PET plastic) with a large extension ratio. Referring to FIG. 2, a thickness of the electric generation region P1 is much larger than a thickness of the electric guiding portion P2, and a roller 9 applies a pressure only on the active material layer 13, so the insulating substrate 11 of the electric generation region P1 has a large extension; during the extension process, the insulating substrate 11 of the electric generation region P1 will apply a tension to the insulating substrate 11 of the electric guiding portion P2, so as to bring the insulating substrate 11 of the electric guiding portion P2 to extend. Correspondingly, the insulating substrate 11 of the electric guiding portion P2 will apply a reaction force to the insulating substrate 11 of the electric generation region P1, so as to limit the extension of the insulating substrate 11 of the electric generation region P1; in the case that the thickness of the electric generation region P1 is uniform, the reaction force gradually decreases along a direction away from the electric guiding portion P2, that is, the extension ratio of the insulating substrate 11 of the electric generation region P1 gradually increases along a direction away from the electric guiding portion P2. Therefore, referring to FIG. 3, after the electrode member is rolled, a length of an end of the electric generation region P1 away from the electric guiding portion P2 is greater than a length of the electric guiding portion P2, which results in the overall bending of the electrode member.

In the secondary battery, an positive electrode member and an negative electrode member are wound together; if the electric generation region P1 of the electrode member bends, the end of the electric generation region P1 cannot be aligned after winding, which causes the active material layer 13 of the negative electrode member not to completely cover the active material layer 13 of the positive electrode member; the lithium-ion deintercalated from the active material layer 13 of the positive electrode member cannot be completely intercalated into the active material layer 13 of the negative electrode member in charging process, which causes the lithium precipitation and affects the performance of the secondary battery.

SUMMARY

An electrode member in accordance with some embodiments comprises an insulating substrate, a conducting layer and an active material layer. The conducting layer is provided on a surface of the insulating substrate, and the conducting layer comprises a main portion and a protruding portion extending from the main portion, the main portion is coated with the active material layer, the protruding portion is not coated with the active material layer. The active material layer comprises a first portion and a second portion, the first portion is positioned at an end of the active material layer away from the protruding portion, the second portion is positioned at a side of the first portion close to the protruding portion and connected with the first portion, and a thickness of the first portion is less than a thickness of the second portion.

Figure 1:
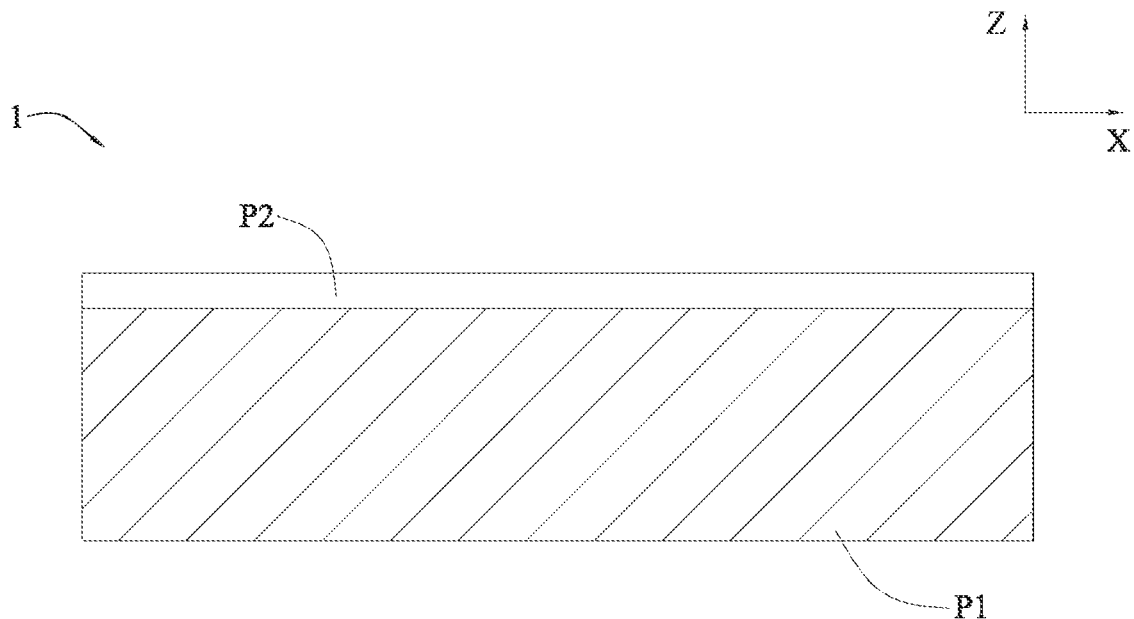
FIG. 1 is a schematic view of an electrode member in prior art.
Figure 2:
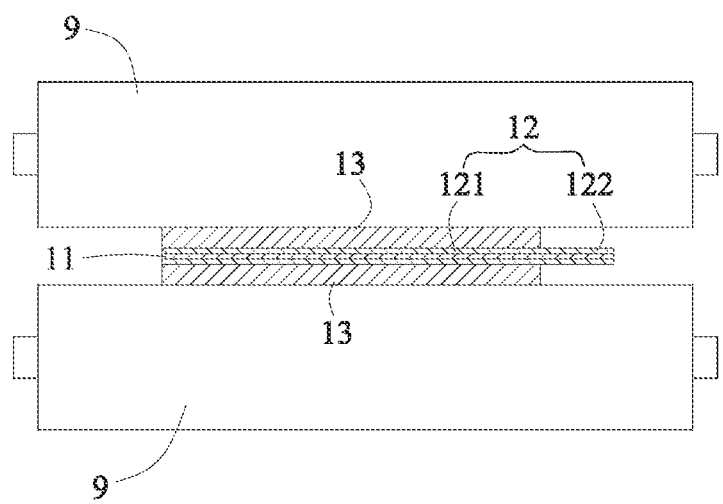
FIG. 2 is a schematic view of the electrode member of FIG. 1 in a rolling process.
Figure 3:
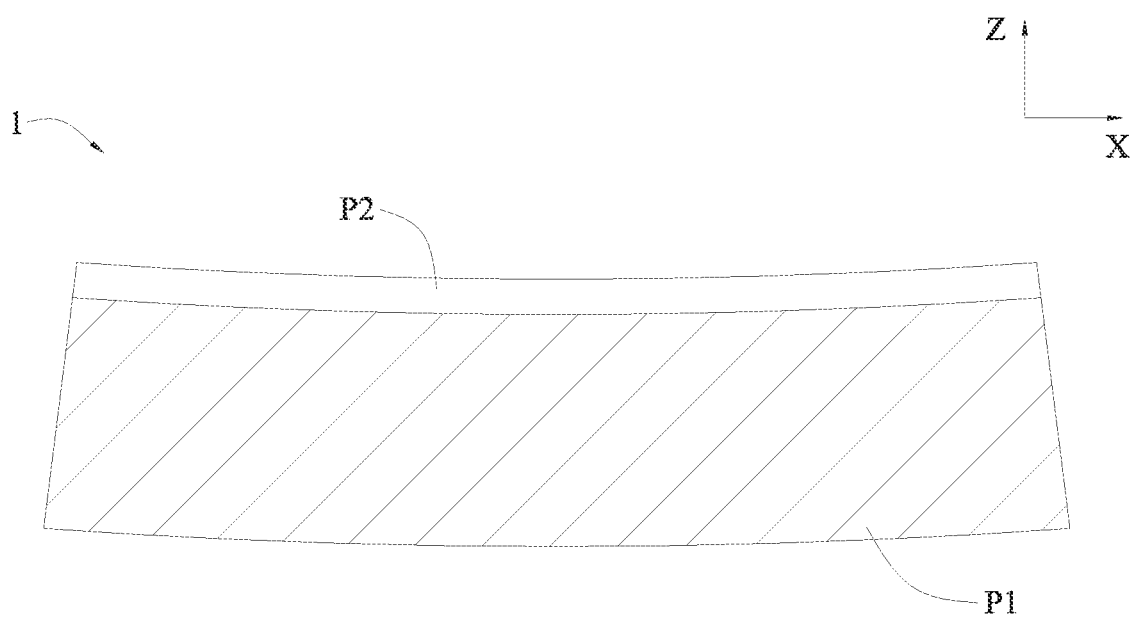
FIG. 3 is a schematic view of the electrode member of FIG. 1 after rolling.

Reference numerals in figures are represented as follows:
1 electrode member
11 insulating substrate
12 conducting layer
121 main portion
122 protruding portion
13 active material layer
131 first portion
132 second portion
133 third portion
14 protecting layer
15 conductive structure
P1 electric generation region
P2 electric guiding portion
2 positive electrode member
3 negative electrode member
4 separator
5 case
6 cap plate
7 electrode terminal
8 connecting piece
9 roller
X width direction
Y thickness direction
Z height direction

DETAILED DESCRIPTION

The technical solutions of embodiments of the present disclosure will be described clearly and completely in combination with the drawings in the embodiments of the present disclosure, it is apparent that the described embodiments are only a part of the embodiments of the present disclosure, and not all of the embodiments. The following description of at least one exemplary embodiment is in fact merely illustrative and is never intended to be any limitation of the present disclosure and its application or use. Based on the embodiments in the present disclosure, all other embodiments obtained by those skilled in the art without creative efforts are within the scope of the present disclosure.

In the description of the present disclosure, it should be understood that, words such as "first", "second" and the like which are used to define the parts, are only intended to distinguish the corresponding parts. Unless otherwise specified, the aforementioned words do not have particular meanings, and thus cannot be understood as limitation on the protection scope of the present disclosure.

Figure 5:
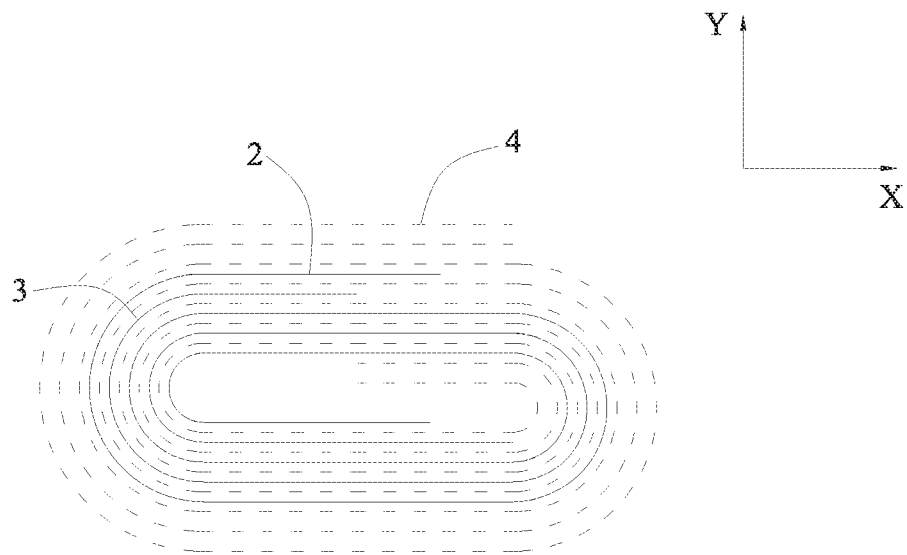
FIG. 5 is a cross-sectional view of an electrode assembly according to the present disclosure.

A secondary battery in accordance with some embodiments includes an electrode assembly, referring to FIG. 5, the electrode assembly includes a positive electrode member 2, a negative electrode member 3 and a separator 4, the separator 4 is provided between the positive electrode member 2 and the negative electrode member 3. The positive electrode member 2, the separator 4 and the negative electrode member 3 are stacked and wound into a flat shape. The electrode assembly is the core component of the secondary battery to realize the charge and discharge function.

The secondary battery in accordance with some embodiments is a pouch-type battery, the electrode assembly formed by winding the positive electrode member 2, the separator 4 and the negative electrode member 3 is directly packaged in a pouch. The pouch in accordance with some embodiments is an aluminum plastic film.

Figure 4:
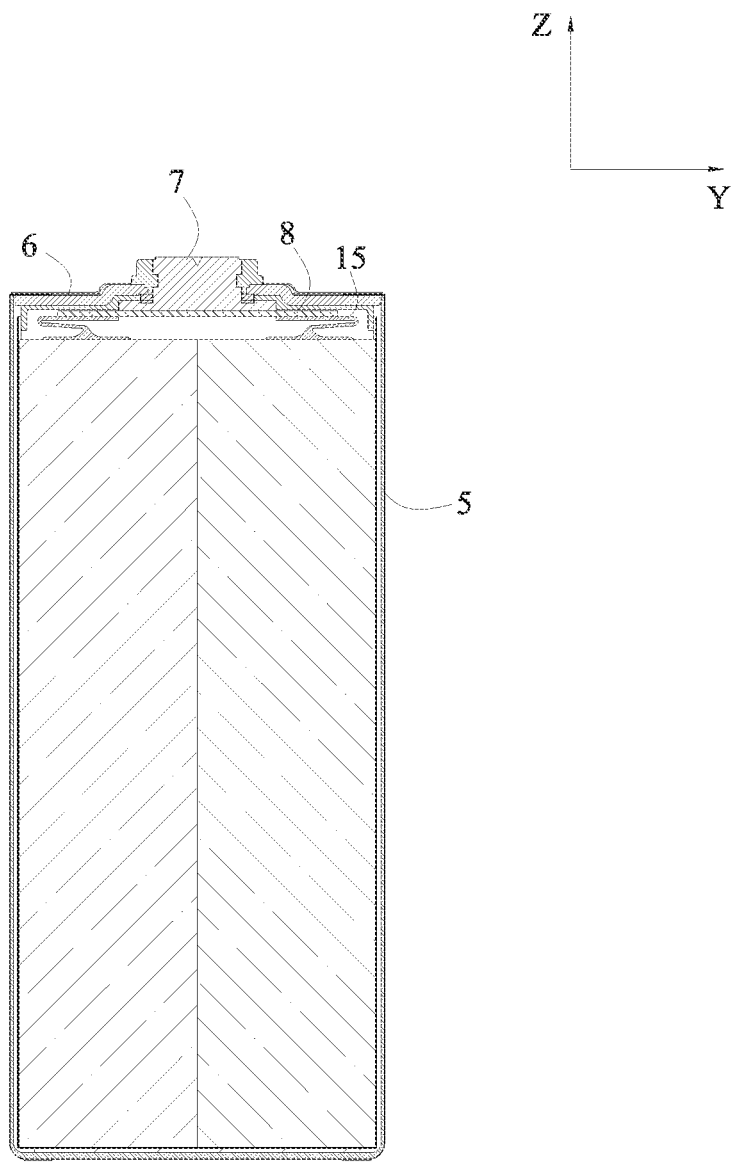
FIG. 4 is a schematic view of a secondary battery according to the present disclosure.

Certainly, the secondary battery in accordance with some embodiments is a can-type battery. Specifically, referring to FIG. 4, the secondary battery mainly includes the electrode assembly, a case 5, a cap plate 6, an electrode terminal 7 and a connecting piece 8.

The case 5 has a hexahedron shape or other shape. A cavity is formed inside the case 5 to receive the electrode assembly and an electrolyte. The case 5 forms an opening at one end, and the electrode assembly can be placed into the cavity of the case 5 via the opening. In some embodiments, the case 5 is made of a conductive metal such as aluminum, aluminum alloy and the like, or the case 5 is made of an insulating material such as plastic and the like.

The cap plate 6 is provided to the case 5 and covers the opening of the case 5, thereby sealing the electrode assembly in the case 5. The electrode terminal 7 is provided to the cap plate 6, and an upper end of the electrode terminal 7 protrudes above the cap plate 6, a lower end of the electrode terminal 7 passes through the cap plate 6 and extends into the case 5. The connecting piece 8 is provided in the case 5 and is fixed with the electrode terminal 7. The electrode terminal 7 and the connecting piece 8 each are provided as two in number, the positive electrode member 2 is electrically connected with one electrode terminal 7 via one connecting piece 8, and the negative electrode member 3 is electrically connected with the other electrode terminal 7 via the other connecting piece 8.

In the secondary battery, at least one of the positive electrode member 2 and the negative electrode member 3 employs an electrode member 1 described later.

FIG. 6 to FIG. 11 are schematic views of a first embodiment of an electrode member 1 of the present disclosure. Referring to FIG. 6 to FIG. 11, the electrode member 1 includes an insulating substrate 11, a conducting layer 12 and an active material layer 13.

In some embodiments, the insulating substrate 11 is made of a PET (polyethylene terephthalate) film or a PP (polypropylene) film. A thickness of the insulating substrate 11 is 1 μm-20 μm.

The conducting layer 12 is provided as two in number and the two conducting layers 12 are respectively provided on two surfaces of the insulating substrate 11. Specifically, a material of the conducting layer 12 is selected from at least one of a metal conductive material and a carbon-based conductive material; in some embodiments, the metal conductive material is at least one of aluminum, copper, nickel, titanium, silver, nickel-copper alloy, and aluminum-zirconium alloy, the carbon-based conductive material is at least one of graphite, acetylene black, graphene, and carbon nanotubes. In some embodiments, the conducting layer 12 is formed on the surface of the insulating substrate 11 by at least one of vapor deposition and electroless plating. The vapor deposition method is a Physical Vapor Deposition (PVD), such as a Thermal Evaporation Deposition.

The active material layer 13 includes an active material, the active material can be determined according to polarity of the electrode member 1; for example, when the electrode member 1 is positive, the active material is lithium manganese oxide or lithium iron phosphate, and when the electrode member 1 is negative, the active material is graphite or silicon. The active material, a binder, a conductive agent and a solvent can be prepared into a slurry, then the slurry is coated on an outer surface of the conducting layer 12 away from the insulating substrate 11, the active material layer 13 is formed after drying the slurry. The active material layer 13 is provided as two in number and the two active material layers 13 are coated on the two conducting layers 12 respectively.

The active material layer 13 covers only a partial region of the conducting layer 12. Specifically, referring to FIG. 7 and FIG. 8, the conducting layer 12 includes a main portion 121 and a protruding portion 122 extending from the main portion 121, the main portion 121 is coated with the active material layer 13, and the protruding portion 122 is not coated with the active material layer 13.

For convenience of description, the active material layer 13, the main portion 121 and a portion of the insulating substrate 11 corresponding to the main portion 121 is referred to as an electric generation region P1, the protruding portion 122 and a portion of the insulating substrate 11 corresponding to the protruding portion 122 is referred to as an electric guiding portion P2. In the use process of the secondary battery, the active material layer 13 of the electric generation region P1 electrochemically reacts with the electrolyte or the like to generate a charge process and a discharge process; and the electric guiding portion P2 is connected with the connecting piece 8 to guide an electric current to the outside of the secondary battery.

Figure 6:
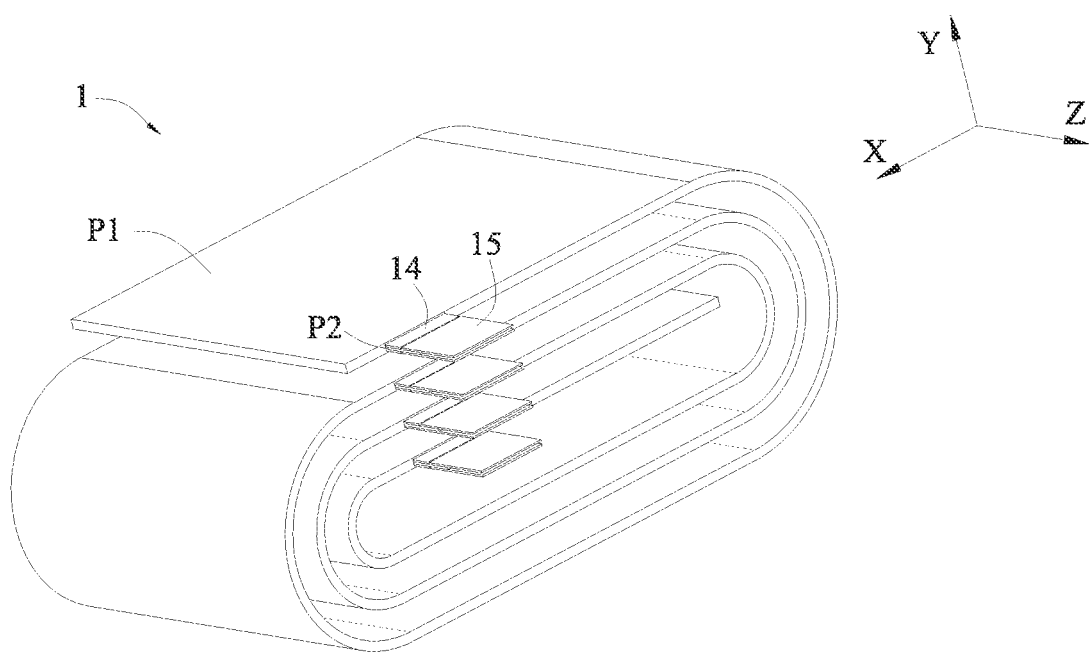
FIG. 6 is a schematic view of an electrode member according to the present disclosure after winding.
Figure 7:
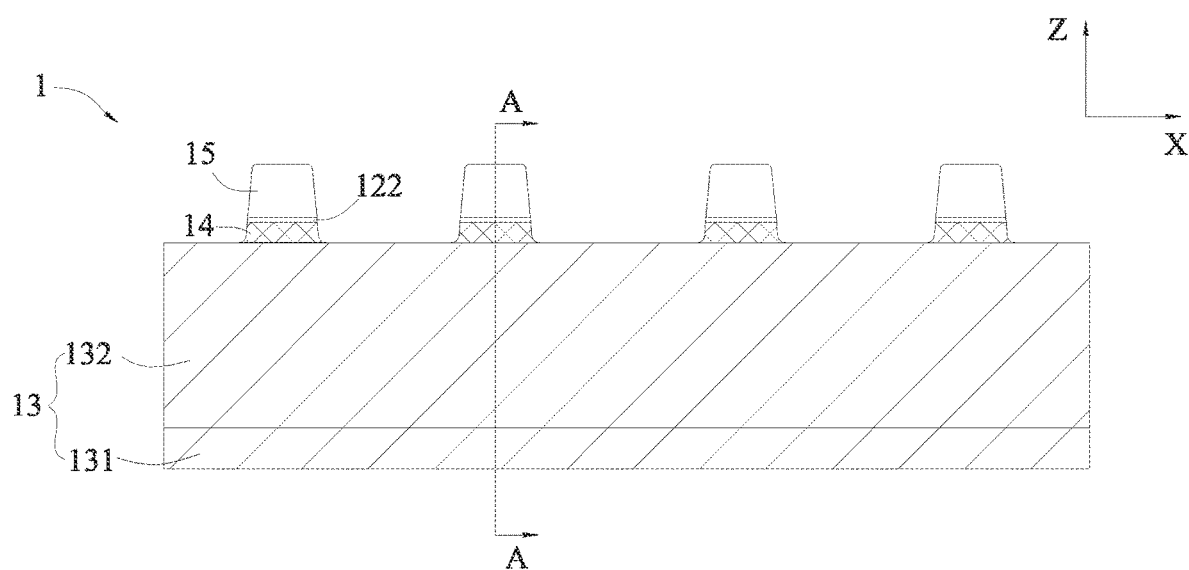
FIG. 7 is a schematic view of the electrode member of FIG. 6 after spread.

Referring to FIG. 7, the electric guiding portions P2 is provided as plurality in number, and the plurality of electric guiding portions P2 are arranged to space apart from each other in a width direction X. In the secondary battery, an electrode assembly is formed by winding the electrode member 1 in positive polarity and the electrode member 1 in negative polarity; referring to FIG. 6, after the electrode member 1 is wound, the plurality of electric guiding portions P2 are stacked in a thickness direction Y and fixed to the connecting piece 8 by welding.

Since the conducting layer 12 is thin, a burr generated by the conducting layer 12 is small in the cutting process and is difficult to pierce the separator 4 having more than ten microns, thereby avoiding short circuit and improving safety performance. Furthermore, when a foreign matter pierces the electrode member 1 of the secondary battery, since a thickness of the conducting layer 12 is small, a burr generated by the conducting layer 12 at a location pierced by the foreign matter is small and is difficult to pierce the separator 4, thereby avoiding short circuit and improving safety performance.

The electrode member 1 further includes a protecting layer 14, the protecting layer 14 is provided at a side of the protruding portion 122 away from the insulating substrate 11 and connected with the active material layer 13. The protecting layer 14 includes a binder and an insulating material, the insulating material includes at least one of aluminum oxide and aluminum oxyhydroxide. The binder, the insulating material and a solvent are mixed together to prepare a slurry, the slurry is coated on a surface of the protruding portion 122, and the protecting layer 14 is formed after drying the slurry. A hardness of the protecting layer 14 is greater than a hardness of the conducting layer 12.

Figure 8:
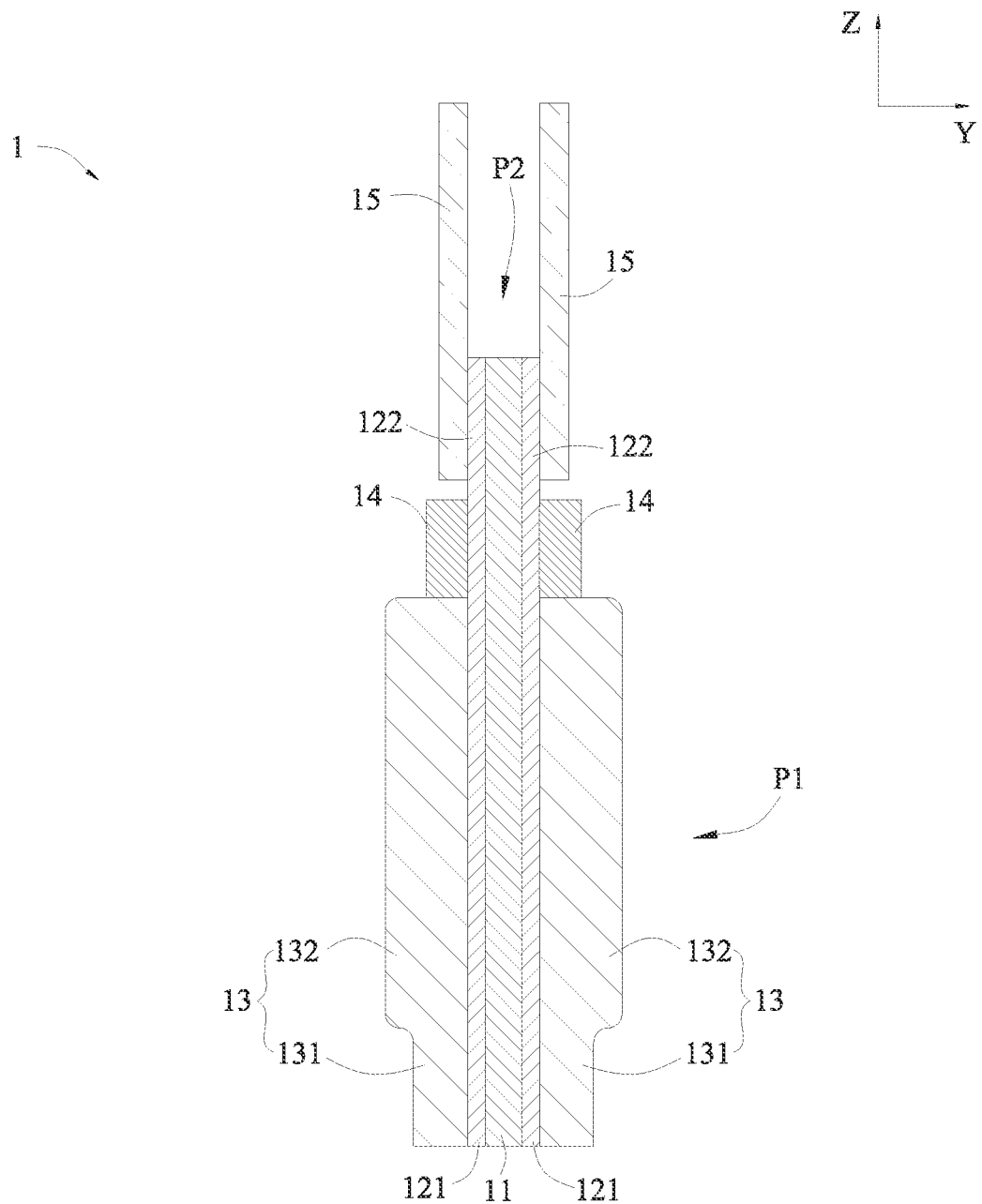
FIG. 8 is a cross-sectional view taken along a line A-A of FIG. 7.

The electrode member 1 further includes a plurality of conductive structures 15, each conductive structure 15 is welded with a region of the protruding portion 122 which is not covered by the protecting layer 14. Referring to FIG. 6, after the electrode member 1 is wound, the plurality of conductive structures 15 are stacked in the thickness direction Y, and the conductive structure 15 is provided between each two adjacent electric guiding portions P2. The plurality of conductive structures 15 are welded to the connecting piece 8, so as to achieve collection and transmission of the electric current of the two conducting layers 12. Referring to FIG. 8, a gap is provided between the protecting layer 14 and the conductive structure 15.

The active material layer 13 includes a first portion 131 and a second portion 132, the first portion 131 is positioned at an end of the active material layer 13 away from the protruding portion 122, the second portion 132 is positioned at a side of the first portion 131 close to the protruding portion 122, and a thickness of the first portion 131 is less than a thickness of the second portion 132.

Figure 9:
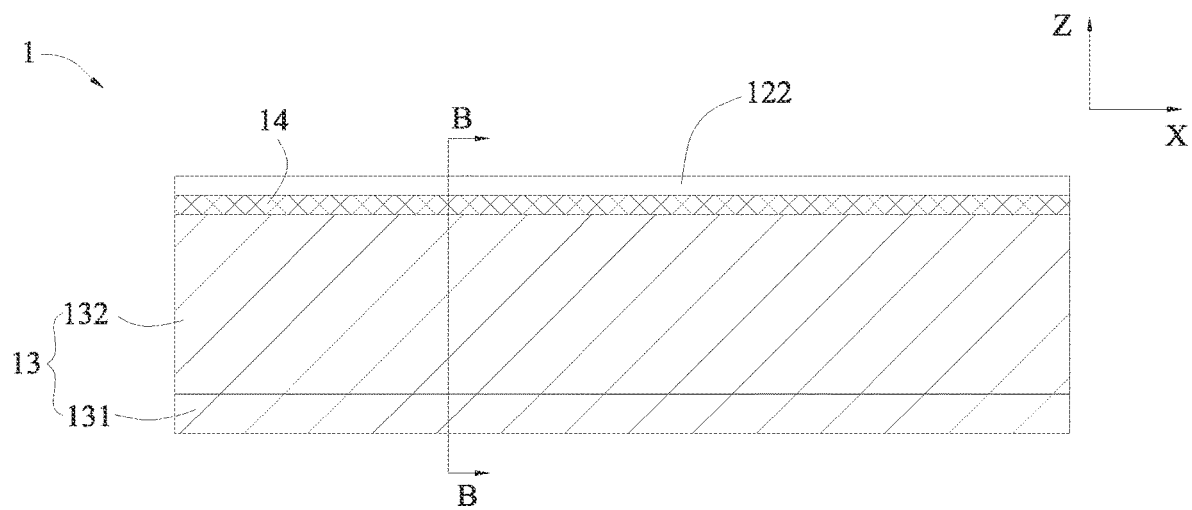
FIG. 9 is a schematic view of the electrode member of FIG. 7 in a forming process.
Figure 10:
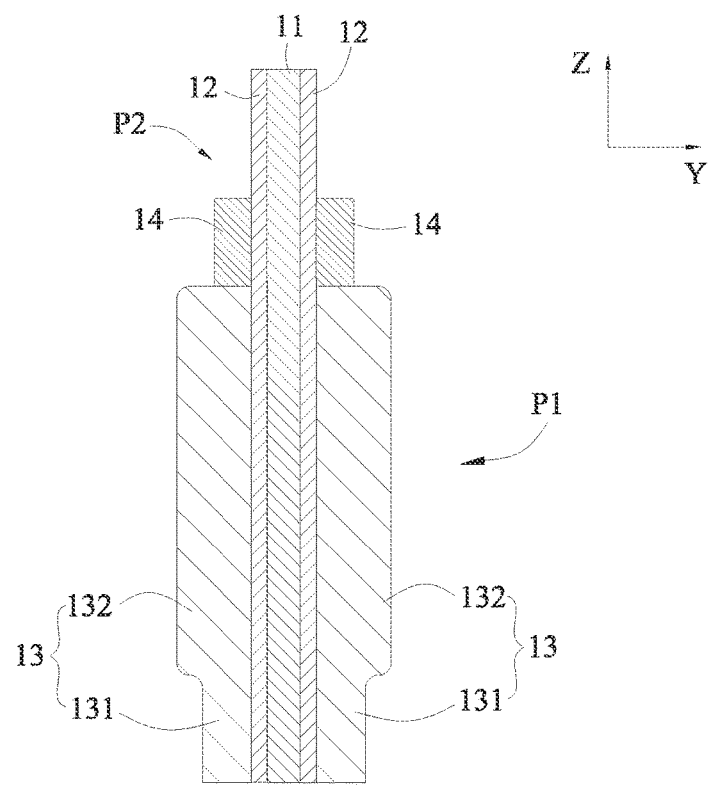
FIG. 10 is a cross-sectional view taken along a line B-B of FIG. 9.

The electrode member 1 of the first embodiment can be formed by the following steps:

(i) forming a conducting layer 12 on the surface of the insulating substrate 11 by vapor deposition or electroless plating to prepare a composite strip;

(ii) referring to FIG. 9, coating the active material layer 13 and the protecting layer 14 on the surface of the conducting layer 12 at the same time, and reducing the thickness of the end of the active material layer 13 away from the protecting layer 14 during coating;

(iii) rolling the active material layer 13 to compact the active material layer 13 to increase the density;

(iv) after the rolling is completed, welding a metal foil (for example, aluminum foil) on the conducting layer 12, and then cutting the metal foil, the protecting layer 14, the conducting layer 12 and the insulating substrate 11 at the same time to obtain the electrode member 1 shown in FIG. 7.

Figure 11:
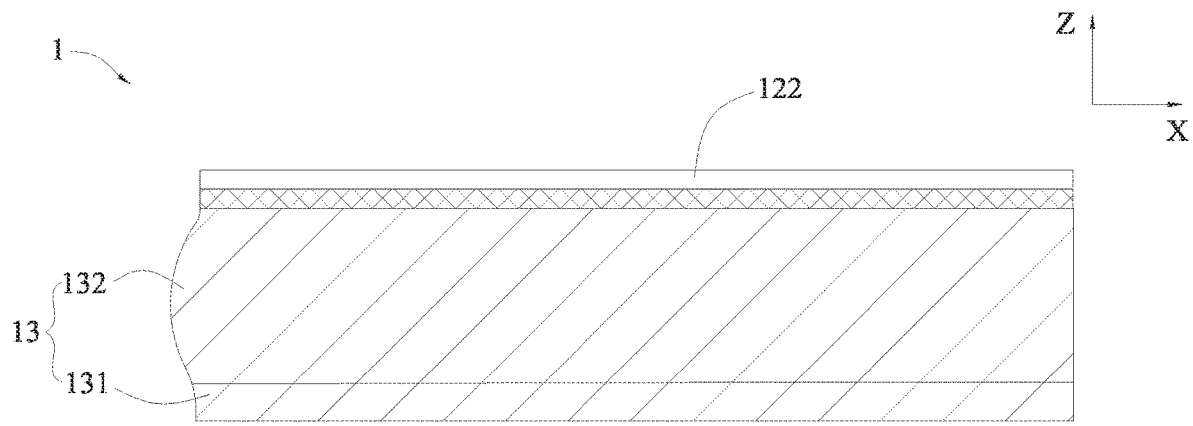
FIG. 11 is a schematic view of the electrode member of FIG. 9 after rolling.

FIG. 11 shows a shape of the electrode member 1 after the rolling process of the step (iii). Since the thickness of the second portion 132 is greater than the thickness of the first portion 131, the second portion 132 is subjected to a larger rolling pressure during the rolling process, and the first portion 131 is subjected to a smaller rolling pressure; that is, a portion of the electric generation region P1 corresponding to the second portion 132 has a larger extension ratio, and a portion of the electric generation region P1 corresponding to the first portion 131 has a smaller extension ratio. In the rolling process, the electric guiding portion P2 is not subjected to the pressure and hardly extends, therefore, referring to FIG. 11, after rolling, the extension ratio of the electrode member 1 at both ends in a height direction Z is smaller, and the extension ratio of a middle portion of the electrode member 1 is larger. The present disclosure reduces the length difference between the two ends of the electrode member 1 in the height direction Z by reducing the thickness of the first portion 131, thereby decreasing the bending deformation of the electrode member 1, and in turns preventing lithium precipitation in the secondary battery.

Since an elastic modulus of the insulating substrate 11 is smaller, the insulating substrate 11 of the electric generation region P1 extends toward an inner side of the protruding portion 122 when the electric generation region P1 is rolled, which causes the insulating substrate 11 at the inner side of the protruding portion 122 to bulge, and the protruding portion 122 is easily cracked under the force of the insulating substrate 11. In the present disclosure, the protecting layer 14 has a greater strength, so the protecting layer 14 can provide a supporting force for the protruding portion 122 in the process of rolling the electrode member 1, thereby limiting the deformation of the protruding portion 122, and decreasing the probability of generating the crack in the protruding portion 122, improving the overcurrent capability of the electrode member 1.

In the working process of the secondary battery, the protrusion 122 may fall off due to factor such as vibration or the like; in some embodiments, the protecting layer 14 is connected with the active material layer 13, so that the protecting layer 14 is fixed to the active material layer 13, thereby increasing the connecting force of the protecting layer 14 in the electrode member 1 and improving the anti-vibration capability, avoiding the protecting layer 14 and the protruding portion 122 falling off together. At the same time, the crack is most prone to be generated at a root portion (that is, at a boundary between the protruding portion 122 and the main portion 121) of the protruding portion 122 close to the active material layer 13, therefore, when the protecting layer 14 is connected with the active material layer 13, it can avoid the protruding portion 122 from being cracked, thereby improving the overcurrent capability of the electrode member 1.

In the height direction Z, a ratio of a dimension of the first portion 131 to a total dimension of the active material layer 13 is from 3% to 20%. Since the elastic modulus of the insulating substrate 11 is smaller, a part of the insulating substrate 11 corresponding to the second portion 132 will apply a force to a part of the insulating substrate 11 corresponding to the first portion 131 in the rolling process, to bring the part of the first portion 131 corresponding to the insulating substrate 11 to extend; and the force is gradually reduced in a direction away from the electric guiding portion P2. If the ratio of the dimension of the first portion 131 to the total dimension of the active material layer 13 is less than 3%, the end of the electric generation region P1 away from the electric guiding portion P2 will still have a larger extension under the action of the force, which will have a limited effect on reducing the length difference between the two ends of the electrode member 1 in the height direction Z. If the ratio of the dimension of the first portion 131 to the total dimension of the active material layer 13 is more than 20%, the capacity of the active material layer 13 will be lowered, which affects the energy density.

When rolling, the rolling pressure subjected by the second portion 132 is greatest, therefore, after the second portion 132 is rolled compactly, a density of the second portion 132 is greater than a density of the first portion 131.

A difference between the thickness of the first portion 131 and the thickness of the second portion 132 is 0.5 μm-20 μm. If the thickness difference is less than 0.5 μm, the first portion 131 is still subjected to a larger rolling pressure, the end of the electric generation region P1 away from the electric guiding portion P2 still has a larger extension, which will have a limited effect on reducing the length difference between the two ends of the electrode members 1 in the height direction Z. If the thickness difference is more than 20 μm, the capacity of the active material layer 13 is lowered, which affects the energy density.

Generally, the extension ratio of the insulating substrate 11 is greater than the extension ratio of the conducting layer 12, so the insulating substrate 11 will apply a force to the conducting layer 12 in the rolling process, so as to bring the conducting layer 12 to extend. If a difference between the extension ratio of the insulating substrate 11 and the extension ratio of the conducting layer 12 is too large, the conducting layer 12 is easily fractured under the influence of the force, which affects the overcurrent capability of the conducting layer 12. Therefore, in some embodiments, the difference between the extension ratio of the insulating substrate 11 and the extension ratio of the conducting layer 12 is not more than 4% under the same force. Moreover, the extension ratio refers to a percentage of an extended length of a material to an original length of the material under a certain pressure.

The greater the extension ratio of the insulating substrate 11 is, the greater the length difference between the two ends of the electrode member 1 in the height direction Z is, at the same time, the more easily the conducting layer 12 is fractured in the rolling process, so in some embodiments, the extension ratio of the insulating substrate 11 is less than 10%. Furthermore, the extension ratio of the insulating substrate 11 is from 1% to 3%.

The other two embodiments will be described below. In order to simplify the description, only the differences between the other two embodiments and the first embodiment will be mainly described below, and parts that are not described can be understood with reference to the first embodiment.

Figure 12:
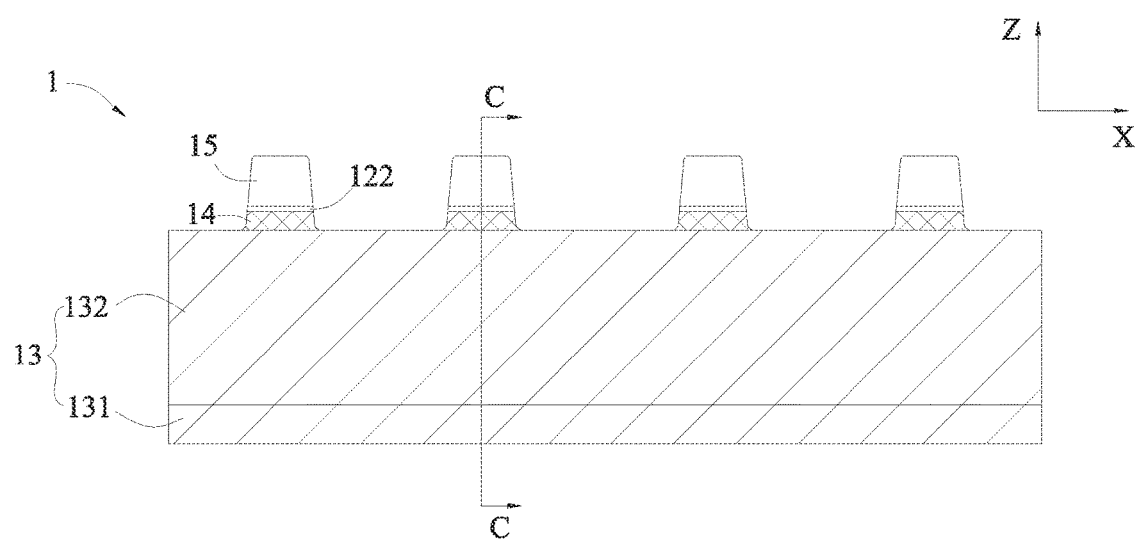
FIG. 12 is a schematic view of another embodiment of the electrode member according to the present disclosure.
Figure 13:
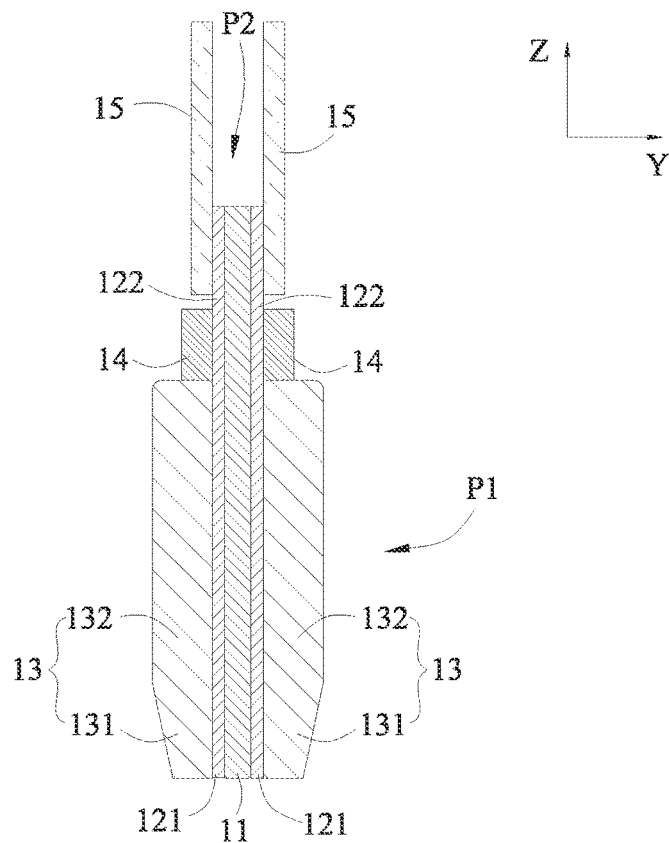
FIG. 13 is a cross-sectional view taken along a line C-C of FIG. 12.

FIG. 12 and FIG. 13 are schematic views of a second embodiment of the electrode member of the present disclosure. Referring to FIG. 12 and FIG. 13, in the second embodiment, the thickness of the first portion 131 is gradually decreased in a direction away from the protruding portion 122. In order to reduce the length difference between the two ends of the electrode member 1 in the height direction Z, it needs to reduce the extension ratio of the end of the electric generation region P1 away from the electric guiding portion P2; therefore, in the first portion 131, the further away from the protruding portion 122 is, the smaller the thickness thereof needs to be, so as to reduce the length difference between the two ends of the electrode member 1 in the height direction Z.

Referring to FIG. 8, in the first embodiment, the first portion 131 is uniformly coated, so the first portion 131 and the second portion 132 have a larger thickness difference at a boundary therebetween; the stress concentrates at the boundary between the first portion 131 and the second portion 132 in the rolling process, therefore, the conducting layer 12 is easily fractured under the stress, thereby affecting the overcurrent capability. In the second embodiment, the first portion 131 gradually becomes thinner in a direction away from the protruding portion 122, which realizes a smooth transition at the boundary between the first portion 131 and the second portion 132, thereby dispersing stress, and reducing stress concentration, avoiding the stress fracturing the conducting layer 12.

Figure 14:
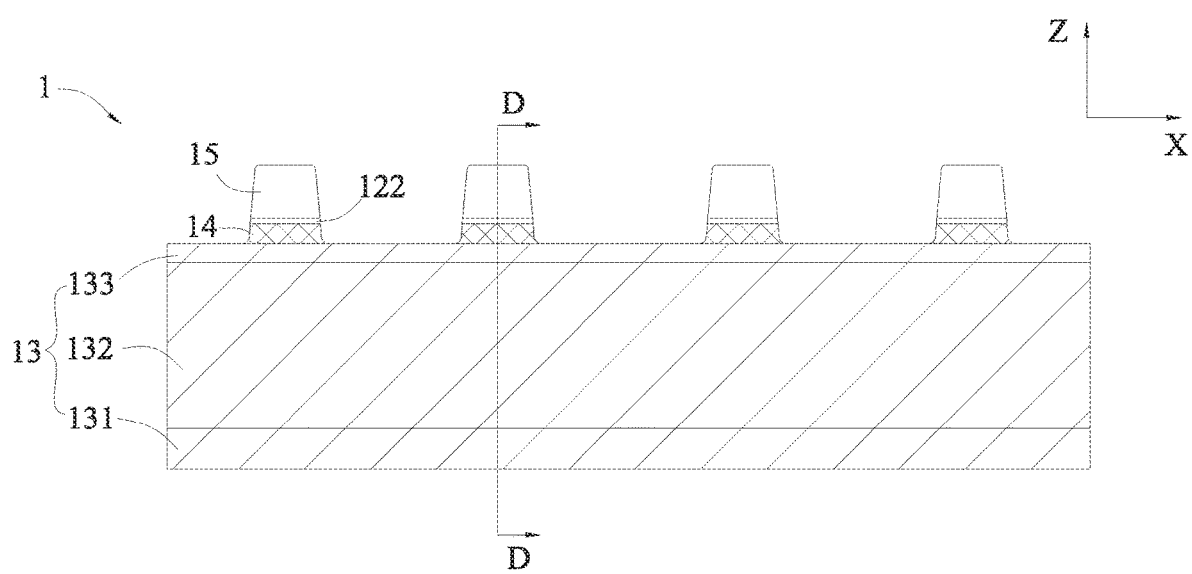
FIG. 14 is a schematic view of still another embodiment of the electrode member according to the present disclosure.
Figure 15:
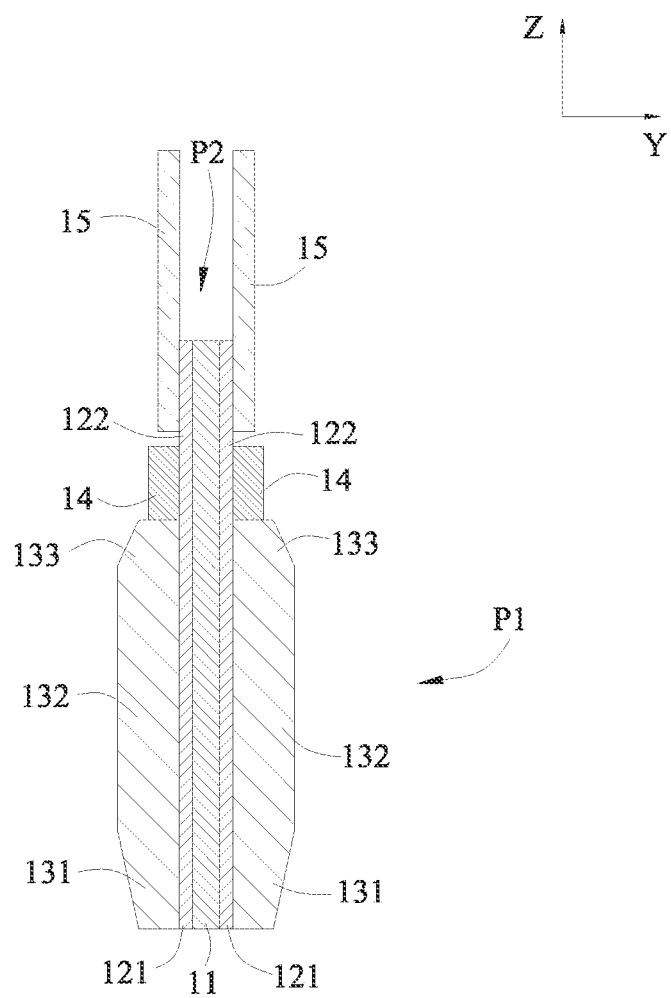
FIG. 15 is a cross-sectional view taken along a line D-D of FIG. 14.

FIG. 14 and FIG. 15 are schematic views of a third embodiment of the electrode member according to the present disclosure. Referring to FIG. 14 and FIG. 15, in the third embodiment, the active material layer 13 further includes a third portion 133, the third portion 133 is positioned at a side of the second portion 132 close to the protruding portion 122, and a thickness of the third portion 133 is less than the thickness of the second portion 132. The third portion 133 is positioned at the end of the active material layer 13 close to the protruding portion 122.

The main portion 121 is subjected to the rolling pressure and the protruding portion 122 is not subjected to the rolling pressure in the rolling process, therefore, the stress is concentrated at the boundary between the main portion 121 and the protruding portion 122. Referring to FIG. 13, in the second embodiment, the protruding portion 122 is directly adjacent to the second portion 132, and the second portion 132 has a larger thickness, therefore, the stress at the boundary between the main portion 121 and the protruding portion 122 is too large, and the main portion 121 and the protruding portion 122 are easily separated and form a crack, which affects the overcurrent capability. In the third embodiment, the stress at the boundary between the main portion 121 and the protruding portion 122 can be reduced by reducing the thickness of the third portion 133, thereby reducing the probability of generating the crack.

Furthermore, the thickness of the third portion 133 gradually decreases along a direction close to the protruding portion 122. The third portion 133 gradually becomes thinner along the direction close to the protruding portion 122, which realizes a smooth transition at the boundary between the second portion 132 and the third portion 133, thereby dispersing stress, and reducing stress concentration, avoiding the stress fracturing the conducting layer 12.

Since the protruding portion 122 is adjacent to the third portion 133, the protecting layer 14 is connected with the third portion 133.

Furthermore, the embodiments of the present disclosure further provide an apparatus, which includes a secondary battery according to any one of the embodiments as described above, wherein the secondary battery is adapted to provide power for the apparatus. The apparatus may be an electric vehicle, a hybrid vehicle, an electric scooter, an electric cart or any other suitable devices which can include the battery pack as their own power source.

What is claimed is:

1. An electrode member of a secondary battery, comprising an insulating substrate, a conducting layer and an active material layer;
    the conducting layer being provided on a surface of the insulating substrate, and the conducting layer comprising a main portion and a protruding portion extending from the main portion, the main portion being coated with the active material layer, the protruding portion being not coated with the active material layer;
    the active material layer comprising a first portion and a second portion, the first portion being positioned at an end of the active material layer away from the protruding portion, the second portion being positioned at a side of the first portion close to the protruding portion and connected with the first portion, and a thickness of the first portion being less than a thickness of the second portion, and a width of the first portion being less than a width of the second portion.

2. The electrode member according to claim 1, wherein the thickness of the first portion is gradually decreased along a direction away from the protruding portion.

3. The electrode member according to claim 1, wherein in a height direction, a ratio of a dimension of the first portion to a total dimension of the active material layer is from 3% to 20%.

4. The electrode member according to claim 1, wherein a density of the second portion is greater than a density of the first portion.

5. The electrode member according to claim 1, wherein a difference between the thickness of the first portion and the thickness of the second portion is 0.5 μm-20 μm.

6. The electrode member according to claim 1, wherein the active material layer further comprises a third portion, the third portion is positioned at a side of the second portion close to the protruding portion and connected with the second portion, and a thickness of the third portion is less than the thickness of the second portion; the thickness of the third portion is gradually decreased along a direction close to the protruding portion.

7. The electrode member according to claim 6, wherein the electrode member further comprises a protecting layer, the protecting layer is provided at a side of the protruding portion away from the insulating substrate and connected with the third portion.

8. The electrode member according to claim 7, wherein a hardness of the protecting layer is greater than a hardness of the conducting layer.

9. The electrode member according to claim 7, wherein the protecting layer comprises a binder and an insulating material, the insulating material includes at least one of aluminum oxide and aluminum oxyhydroxide.

10. The electrode member according to claim 7, wherein the electrode member further comprises a conductive structure, the conductive structure is welded with a region of the protruding portion which is not covered by the protecting layer.

11. The electrode member according to claim 10, wherein a gap is provided between the protecting layer and the conductive structure.

12. The electrode member according to claim 1, wherein the electrode member further comprises a protecting layer, the protecting layer is provided at a side of the protruding portion away from the insulating substrate and connected with the active material layer.

13. The electrode member according to claim 12, wherein the electrode member further comprises a conductive structure, the conductive structure is welded with a region of the protruding portion which is not covered by the protecting layer.

14. The electrode member according to claim 1, wherein, when under a pressure, a difference between an extension ratio of the insulating substrate and an extension ratio of the conducting layer is not more than 4%.

15. The electrode member according to claim 14, wherein the extension ratio of the insulating substrate under the pressure is less than 10%.

16. A secondary battery, comprising an electrode assembly, the electrode assembly comprising an electrode member;
    the electrode member comprising an insulating substrate, a conducting layer and an active material layer;
    the conducting layer being provided on a surface of the insulating substrate, and the conducting layer comprising a main portion and a protruding portion extending from the main portion, the main portion being coated with the active material layer, the protruding portion being not coated with the active material layer;
    the active material layer comprising a first portion and a second portion, the first portion being positioned at an end of the active material layer away from the protruding portion, the second portion being positioned at a side of the first portion close to the protruding portion and connected with the first portion, and a thickness of the first portion being less than a thickness of the second portion, and a width of the first portion being less than a width of the second portion.

17. The secondary battery according to claim 16, wherein the active material layer further comprises a third portion, the third portion is positioned at a side of the second portion close to the protruding portion and connected with the second portion, and a thickness of the third portion is less than the thickness of the second portion; the thickness of the third portion is gradually decreased along a direction close to the protruding portion.

18. The secondary battery according to claim 17, wherein the electrode member further comprises a protecting layer, the protecting layer is provided at a side of the protruding portion away from the insulating substrate and connected with the third portion.

19. The secondary battery according to claim 18, wherein the electrode member further comprises a conductive structure, the conductive structure is welded with a region of the protruding portion which is not covered by the protecting layer.

20. An apparatus, comprising a secondary battery according to claim 16, wherein the secondary battery is adapted to provide power for the apparatus.

* * * * *